(12) United States Patent
Yeldham (10) Patent No.: US 10,853,865 B2
(45) Date of Patent: Dec. 1, 2020

(54) SYSTEMS AND METHODS FOR DYNAMICALLY DETERMINING ACTIVITY LEVELS IN A SELECTED GEOGRAPHICAL REGION

(71) Applicant: MASTERCARD INTERNATIONAL INCORPORATED, Purchase, NY (US)

(72) Inventor: Keith J. Yeldham, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 129 days.

(21) Appl. No.: 16/030,618

(22) Filed: Jul. 9, 2018

(65) Prior Publication Data
US 2020/0013102 A1 Jan. 9, 2020

(51) Int. Cl.
*G06Q 30/00* (2012.01)
*G06Q 30/06* (2012.01)
*G06Q 50/00* (2012.01)
*G06F 16/29* (2019.01)

(52) U.S. Cl.
CPC ......... *G06Q 30/0625* (2013.01); *G06F 16/29* (2019.01); *G06Q 50/01* (2013.01)

(58) Field of Classification Search
CPC ......... G06K 2009/00738; G06Q 50/01; G06Q 30/0601–0645; G06Q 30/80
USPC ..... 705/26.1, 27.1, 26.2, 26.25, 26.3, 26.35, 705/26.4, 26.41, 26.42, 26.43, 26.44, 705/26.5, 26.6, 26.61, 26.62, 26.63, 705/26.64, 26.7, 26.8, 26.81, 26.82, 26.9, 705/27.2
See application file for complete search history.

(56) References Cited

U.S. PATENT DOCUMENTS

| 8,938,686 B1 | 1/2015 | Erenrich et al. |
| 9,003,030 B2 | 4/2015 | Miller et al. |
| 9,117,238 B2 | 8/2015 | Tapley et al. |
| 2010/0198626 A1* | 8/2010 | Cho ........................ G06Q 10/02 705/5 |

(Continued)

OTHER PUBLICATIONS

Anonymous, "MEXIA interactive deploying world's largest array of indoor sensors at Super Mobility Week," Information Gatekeepers, Inc., Aug. 2014, 2.5G-4G, 13(8), 8(2).*

*Primary Examiner* — Brandy A Zukanovich
(74) *Attorney, Agent, or Firm* — Armstrong Teasdale LLP (57) ABSTRACT

An active locations (AL) computing device is described herein. The AL computing device is programmed to receive, from a user computing device, a selection of a geographical region. The AL computing device may retrieve transaction data from a payment processing network, environmental data representing environmental conditions at the selected geographical region, merchant data representing characteristics of one or more merchants located within the selected geographical region, social media data including events occurring within the selected geographical region, and historical data. The AL computing device is further programmed to determine activity levels for the selected geographical region based on one or more of the transaction data, environmental data, merchant data, social media data, and historical data. The AL computing device may convert the determined activity levels into an interactive heat map, apply a filter to the heat map, and transmit the heat map to the user computing device.

14 Claims, 7 Drawing Sheets

(56) References Cited

U.S. PATENT DOCUMENTS

| | | | |
|---|---|---|---|
| 2012/0094639 A1* | 4/2012 | Carlson | H04W 4/029 455/414.1 |
| 2015/0324891 A1 | 11/2015 | Tapley et al. | |
| 2016/0042374 A1 | 2/2016 | Weis et al. | |
| 2017/0132649 A1* | 5/2017 | Oliva | G06Q 30/0205 |

* cited by examiner

SYSTEMS AND METHODS FOR DYNAMICALLY DETERMINING ACTIVITY LEVELS IN A SELECTED GEOGRAPHICAL REGION

BACKGROUND

This disclosure relates generally to identifying a level of human social activity in a region and more particularly, to a network-based system and method for collecting and converting activity data in the region into an accessible format and displaying it in a user interface system having filter controls.

When visiting a new place, tourists and travelers often have difficulty determining which restaurants, retail shops, or nightlife locations (e.g., bars, clubs) are the most popular. Even for a resident or a frequent visitor to an area, it may be difficult to determine which areas are more active. In some cases, people may wish to avoid extremely busy areas and plan travel times for when a desired location is less busy. In other cases, people may wish to locate and visit the active areas.

Planning for visits according to these preferences can be difficult, and generally requires gathering a wide variety of data from a multitude of sources and incorporating many different factors. Factors such as the weather, traffic, parking, time of year, and the like all must be considered. Further, as a traveler proceeds to an intended destination, activity in the desired location may change due to local events. Combining this information to predict whether an area is active or busy requires a sophisticated analysis, which is very difficult if not impossible to conduct in a timely manner prior to or during travel to the area. Currently, people generally rely on word-of-mouth or personal experience to identify popular locations, which may not be reliable. It would be beneficial for users to be able to quickly and easily identify active or "popular" areas that may be of interest to travelers.

BRIEF DESCRIPTION

In one aspect, an active locations (AL) computing device is provided. The AL computing device includes at least one processor in communication with at least one memory device. The AL computing device is programmed to receive, from a user computing device, a selection of a geographical region, retrieve transaction data from a payment processing network, retrieve environmental data including data representing environmental conditions at the selected geographical region, retrieve merchant data representing characteristics of one or more merchants located within the selected geographical region, retrieve social media data including events occurring within the selected geographical region, and retrieve, from a historical database, historical data including at least one of historical transaction data, historical environmental data, historical merchant data, and historical social media data for the selected geographical region. The AL computing device is further programmed to determine activity levels for the selected geographical region based on one or more of the transaction data, environmental data, merchant data, social media data, and historical data. The AL computing device is also programmed to convert the determined activity levels into a user interactive heat map representing the activity levels for the selected geographical region. The AL computing device is configured to apply a user-controlled filter to the heat map. The AL computing device is further programmed to transmit the filtered heat map for the selected geographical region to the user computing device to cause the filtered heat map to be displayed on the user computing device.

In another aspect, a computer-implemented method for identifying active locations within a geographical region using an active locations (AL) computing device is provided. The AL computing device includes at least one processor in communication with at least one memory device. The method includes receiving, from a user computing device, a selection of a geographical region, and retrieving transaction data from a payment processing network. The method also includes retrieving environmental data including data representing environmental conditions at the selected geographical region. The method further includes retrieving merchant data representing characteristics of one or more merchants located in the selected geographical region, retrieving social media data including events occurring within the selected geographical region, and retrieving, from a historical database, historical data including at least one of historical transaction data, historical environmental data, historical merchant data, and historical social media data for the selected geographical region. The method further includes determining activity levels for the selected geographical region based on one or more of the transaction data, environmental data, merchant data, social media data, and historical data. The method also includes converting the determined activity level into a user interactive heat map representing the activity levels for the selected geographical region, applying a user-controlled filter to the heat map, and transmitting the filtered heat map for the selected geographical region to the user computing device to cause the filtered heat map to be displayed on the user computing device.

In a further aspect, a non-transitory computer-readable storage medium having computer-executable instructions embodied thereon is provided. When executed by an active locations (AL) computing device, which includes at least one processor in communication with a memory device, the computer-executable instructions cause the at least one processor to receive, from a user computing device, a selection of a geographical region, retrieve transaction data from a payment processing network, and retrieve environmental data including data representing environmental conditions at the selected geographical region. The computer-executable instructions also cause the at least one processor to retrieve merchant data representing characteristics of one or more merchants located within the selected geographical region, retrieve social media data including events occurring within the selected geographical region, and retrieve, from a historical database, historical data including at least one of historical transaction data, historical environmental data, historical merchant data, and historical social media data for the selected geographical region. The computer-executable instructions also cause the at least one processor to determine activity levels for the selected geographical region based on one or more of the transaction data, environmental data, merchant data, social media data, and historical data. The computer-executable instructions also cause the at least one processor to convert the determined activity levels into a user interactive heat map representing the activity levels for the selected geographical region based, apply a user-controlled filter to the heat map, and transmit the filtered heat map for the selected geographical region to the user computing device to cause the filtered heat map to be displayed on the user computing device.

BRIEF DESCRIPTION OF THE DRAWINGS

FIGS. 1-7 show example embodiments of the methods and systems described herein.

Like numbers in the Figures indicate the same or functionally similar components.

DETAILED DESCRIPTION

The system and methods described herein enable a user to identify active or "popular" locations (e.g., bars, restaurants, stores, entertainment areas, etc.) in a geographical region. In particular, the system collects and converts activity information using environmental data, transaction data, merchant input data, and user-generated social media data into a visually accessible format to facilitate travel and entertainment planning.

In an example embodiment, an active locations computer system includes an active locations (AL) computing device including at least one processor in communication with at least one memory device. The AL computing device is configured to receive and process transaction data and other external data sets including environmental data, merchant input data, and social media data. Transaction data may include recent or historical data associated with payment transactions, initiated by a customer at a merchant location. Environmental data may include information such as current weather conditions or predicted future weather conditions, physical features such as size and capacity of retail shopping centers, current or predicted traffic conditions, and the like. Merchant input data may include information such as capacity of retail shops, average duration of customer visits, average wait times, type or category of goods or services offered, special events at a merchant business likely to draw additional retail traffic such as live musicians, or sales related information also likely to increase customer traffic. Social media data may include information created and published by individual and/or institutional users describing activities in a geographical region.

In some embodiments, the merchant data, transaction data environmental data and/or social media data are anonymized and aggregated (e.g., by the payment processing network and/or social media servers, etc.) prior to receipt by the AL computing device (i.e., no personally identifiable information (PII) is received by the AL computing device). In other embodiments, the AL computing device may be configured to receive the merchant data, transaction data, environmental data and/or social media data that are not yet anonymized and/or aggregated, and thus may be configured to anonymize and aggregate the merchant data, transaction data, environmental data and/or social media data. In such embodiments, any PII received by the AL computing device is received and processed in an encrypted format, and/or is received with the consent of individuals and/or merchants with which the PII is associated. In situations where the systems discussed herein collect personal information about individuals including users and/or merchants, or may make use of such personal information, such individuals may be provided with an opportunity to control whether such information is collected or whether and/or how such information is used. For example individuals and/or merchants may receive notification of the use of certain data. Alternatively, or in addition, individuals and/or merchants may choose to exempt their data from use by the computer system (e.g., opt out). Alternatively, or in addition, certain data may be processed in one or more ways before it is stored or used, so that personally identifiable information is removed.

The AL computing device is configured to continuously parse the data retrieved from the various sources. More specifically, the AL computer system is uniquely located to receive payment transaction data on a continuous and real-time basis from the payment network processor. The AL computing device may convert the payment transaction data, merchant data, environmental data, and/or social media data into a uniform data format. The conversion of the data may include storing the data in a lookup table, for example, arranged by geographical location. The conversion of the data may further encompass arrangement by time, statistical analysis, or some combination thereof. The converted data may also be arranged by a weighted distribution based on the recency of the activity data. The converted data may be in a format that is readily accessible as activity level data for a particular geographical location. For example, the converted data may be retrieved based on location (e.g., GPS coordinates, longitude and latitude, street address, neighborhood, etc.). In the example embodiment, discrete activity level data records may be associated with a specific location. Using this configuration, the AL computing device may immediately access activity level data for the specific location. The AL computing device may quickly transmit, to a user computing device, the activity level data for display as a real-time "heat map" overlaid on a street map.

The particular street map may be determined by the user according to desired travel plans. A street map encompassing a larger area may require conversion of precise data points into generalized data points. Conversion of the data points may include averaging activity levels. The converted data points may then be displayed on the street map. Alternatively or additionally, if a user is traveling, the user computing device may be quickly updated with different geographical locations.

By visually inspecting the heat map, the user may readily determine desirable locations to travel to (e.g., restaurants, bars, etc.) based upon the determined activity levels. For example, visually displaying the data in the form of a heat map allows a user to quickly locate "popular" locations by visually identifying the "high heat" areas that would not otherwise be easily determinable. Alternatively or additionally, a user may determine highly active locations on the heat map and avoid travel to those areas. The user may then arrange travel plans according to the visual representation of the activity data. For example, in response to a high velocity of payment transactions in a particular location, coupled with a high volume of social media data, desirable environmental factors, and merchant input data designed to increase traffic to the area, a user may quickly and easily alter travel plans according to the "high heat" or "popular" areas. The AL computing device may be in communication with a user computing device and may transmit to the device the visual representation of the activity level data to the user computing device for additional convenience and benefit to users. Alternatively, if the user is interested in visiting the active locations, the user may travel to and visit the high heat areas. In some embodiments, the user computing device may be a kiosk, or an interactive shopping mall or neighborhood directory.

In the example embodiment, the AL computing device is configured to interact with a user interface displayed on the user computing device. The user computing device may allow a user to alter the amount or type of activity data displayed. For example, a user interested in activity involving only high value payment transactions (e.g., transactions over $100, $200, $500, etc.) may eliminate or filter out activity relating to low value payment transactions from the display. Alternatively, or in addition, the user may filter out activity data based on categories such as merchant type. For example, if a user is only interested in locating highly active bars, the display may be configured to allow the activity data to hide or conceal activity data associated with restaurants and shopping areas. The AL computing device may also be configured to transmit a time lapse of activity levels for a selected geographical region based on historical data for that region. Alternately, or in addition, the user may select an option to include predicted activity levels based on the historical data for the selected geographical region.

In the example embodiment, the user may search or select a geographical region by map coordinates or by category or type of activity. The geographic region may be automatically selected by a default setting or by GPS or other location-based methods. For example, if a user frequently visits a particular location, the geographical region may be configured to be automatically selected as that location and process activity data associated with that location. Alternately, or in addition, the user may enlarge or narrow the selected geographical area to refine or broaden a search.

At least one of the technical problems addressed by this system includes: (i) gathering real time data based on recent payment transactions to identify active areas; (ii) gathering data about active or popular locations from multiple disparate sources of data and converting the data into a visually accessible format; (iii) reliance on word-of-mouth or user-generated information about active or popular locations; and (iv) lack of preparedness for unknown high-density events or locations within a selected geographical region.

A technical effect of the systems and processes described herein is achieved by performing at least one of the following steps: (i) receiving a geographical region selection; (ii) receiving transaction data from a payment processing network; (iii) receiving environmental data including data from a plurality of sources describing characteristics of the geographical region; (iv) receiving merchant generated data associated with a merchant business; (v) receiving user generated social media data associated with the geographical region; (vi) receiving historical data including at least previously received transaction data, environmental data, merchant data, and social media data, from a database; (vii) determining an activity level for the geographical region; (viii) converting the activity level data into a heat map; (ix) configuring the heat map based on user defined filters; and (x) transmitting the activity level for the geographical region to a user computing device.

Described herein are computer systems such as activity level computing devices. As described herein, all such computer systems include at least one processor and at least one memory. However, any processor in a computer device referred to herein may also refer to one or more processors wherein the processor may e in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, ORACLE® Database, MySQL, IBM® DB2, MICROSOFT® SQL Server, SYBASE®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the development and sale of financial instruments associated with a financial analytics of a geographical sector.

Figure 1:
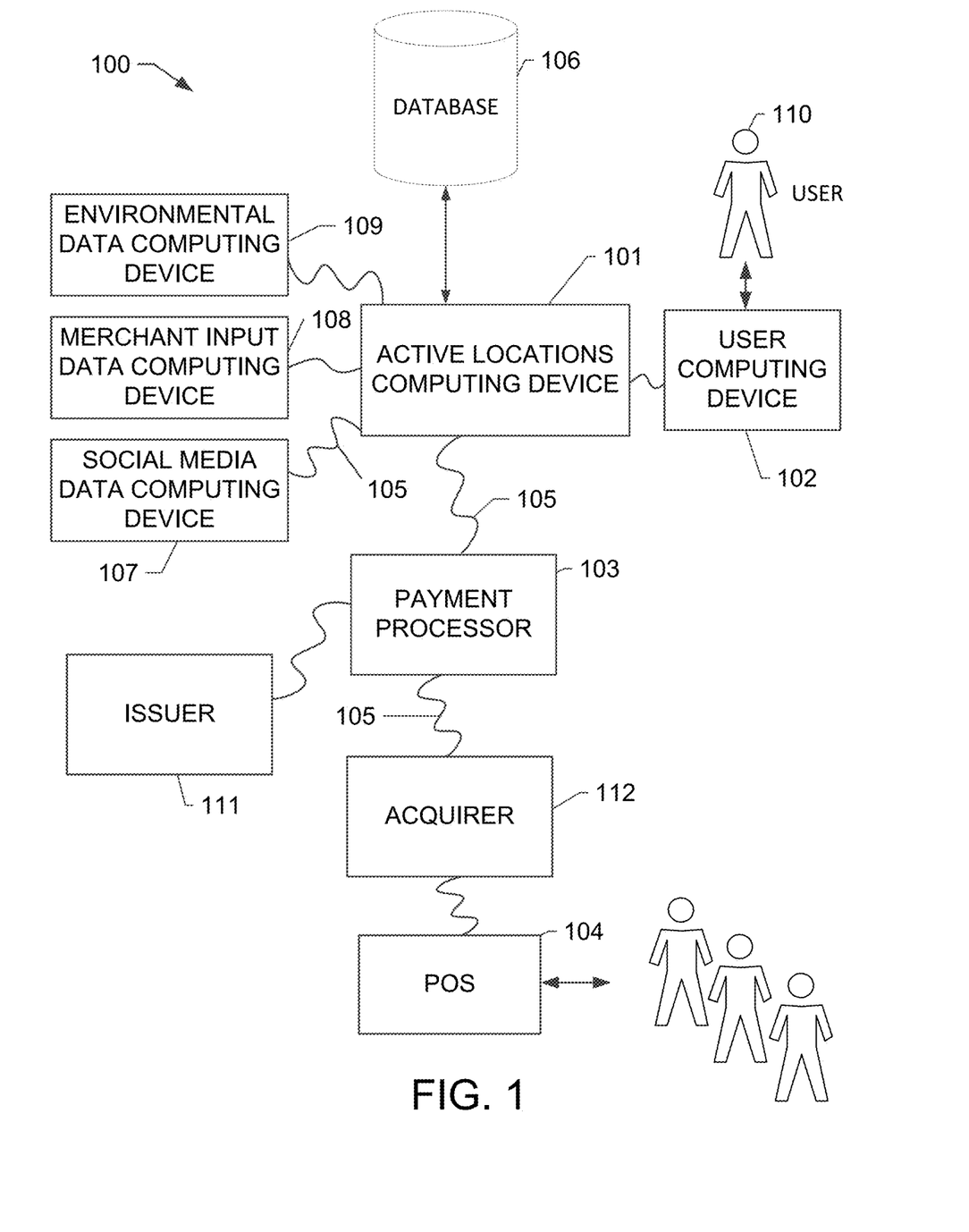
FIG. 1 is a schematic block diagram of an example embodiment of an active locations (AL) computer system for identifying active locations within a geographical region, in accordance with one embodiment of the present disclosure.

FIG. 1 is a schematic block diagram of an example embodiment of an active locations (AL) computer system 100 for identifying active or "popular" locations within a region. More specifically, in the example embodiment, AL computer system 100 includes an active locations (AL) computing device 101, and a user computing device 102. AL computer system 100 may also include a plurality of merchant systems, also referred to as point-of-sale (POS) systems 104, in communication with AL computing device 101 through a payment processor 103. POS 104 systems may include, for example, acquirer computing devices, merchant computing devices, and/or a website associated with the merchant that can be used for making a payment transaction. Computer system 100 also includes user 110 who is interested in using AL computing device 101 to identify active locations. In one embodiment, user computing device 102 may include a communication interface (e.g., including a web browser or other web-access capability), such that AL computing device 101 is accessible to user computing device 102 using the Internet or other network. POS systems 104 are interconnected to the Internet through many interfaces including a network 105, such as a local area network (LAN) or a wide area network (WAN), dial-in-connections, cable modems, special high-speed Integrated Services Digital Network (ISDN) lines, and RDT networks. User computing device 102 could be any device capable of interconnecting to the Internet, including a web-based phone, personal computer, server computing device, or other web-based connectable equipment. AL computing device 101 is also in communication with payment processor 103 through network 105.

Payment processor 103 is associated with and/or integral to a payment processing network (not shown). Payment processing network includes payment processor 103 in communication with a financial institution called an "issuing bank" or "issuer" 111 which issues a transaction card, such as a credit card, to a consumer or cardholder, who uses the transaction card to tender payment for a purchase from a merchant. To accept payment with the transaction card, the merchant establishes an account with a financial institution that is part of the financial payment system. This financial institution is usually called the "merchant bank," the "acquiring bank," or the "acquirer" 112. When the cardholder tenders payment for a purchase with a transaction card, the merchant submits an authorization request to a merchant bank for the amount of the purchase, for example, by receiving account information associated with the cardholder and communicating the account information to the merchant bank. Using payment processor 103, the merchant bank will communicate with issuer 111 to determine whether the cardholder's account is in good standing and whether the purchase is covered by the cardholder's available credit line. Based on these determinations, the request for authorization will be declined or accepted. If a request for authorization is accepted, the available credit line of the cardholder's account is decreased. If the cardholder uses a debit card, the available funds in the cardholder's account will be decreased. AL computing device 101 may receive transaction information from payment processor 103 and may store the transaction card information, such as a type or category of merchant, amount of purchase, date of purchase, in a database (e.g., database 106, described further herein).

After a purchase has been made, a clearing process occurs to transfer additional transaction data related to the purchase among the parties to the transaction. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data. Payment processor 103 is configured to process transaction data generated in association with a plurality of financial transactions as described above. Transaction data includes such elements as a transaction amount; a merchant identifier; an account identifier (associating the transaction with the cardholder); a time and date stamp; and a location identifier, which may identify where the transaction was initiated, a location of the cardholder at the time the transaction was initiated, and/or the location of the merchant (e.g., POS device 104). Payment processor 103 may transmit the transaction data to AL computing device 101, which may subsequently store the transaction data in database 106.

The transaction data includes information associated with a processed transaction and is representative of consumer activity at a particular geographic location. Accordingly, payment processor 103 transmits the transaction data to AL computing device 101 to provide accurate, real-time representations of consumer activity, and thereby population density, at merchant locations within a selected geographic region. Where "transaction location" is used herein, it may refer to a merchant location and/or a cardholder location associated with the transaction. For example, for "card-present" transactions, the merchant location is indicative of where the consumer or cardholder was during the transaction, and accordingly is indicative of a population at the merchant location. For "card-not-present" transactions, such as online purchases, or for transactions initiated with a nomadic merchant (e.g., Uber driver, taxi, food truck, etc.), the cardholder location (e.g., IP address, GPS location, etc.) is indicative of where the consumer or cardholder is, even if the merchant location associated with the transaction may not be within the selected geographic region.

AL computing device 101 is connected to database 106, which contains information on a variety of matters, as described below in greater detail. In one embodiment, database 106 is stored on AL computing device 101. In an alternative embodiment, database 106 is stored remotely from AL computing device 101 and may be non-centralized. Database 106 may include a single database having separated sections or partitions or may include multiple databases, each being separate from each other. In one embodiment, database 106 may store street maps, records of activities, event identifier and schedules, semi-empirical analyses including schedules of population shifts according to temporal or other external occurrences, and/or additional information as described herein. In the example embodiment, database 106 may further store transaction data received from payment processor 103 ("raw transaction data") and/or a plurality of transaction records received by AL computing device 101, each transaction record associated with one of the plurality of transactions and including a transaction location and time stamp. Database 106 may be configured to store transaction records for a particular period of time from the time stamp, or for an "expiration time," at which time database 106 may delete an expired transaction record therefrom. In other embodiments, database 106 may store each transaction record indefinitely. In the example embodiment, each transaction record contains no personally identifiable information (PII) of cardholders initiating the transactions and/or accounts thereof.

AL computing device 101 is further configured to receive transaction data from payment processor 103 and/or retrieve transaction data stored in database 106. In the example embodiment, AL computing device 101 receives transaction data associated with transactions initiated at merchant locations within the selected geographical region. "Merchant location" may refer to permanent or semi-permanent (e.g., seasonal) brick-and-mortar locations as well as "temporary" merchant locations, such as "pop-up" shops, merchants operating at booths at events, garage sales, and other nomadic-type merchants (e.g., Uber, taxi, food truck, etc.). In one embodiment, AL computing device 101 is configured to receive "pre-filtered" transaction data from payment processor 103, or transaction data that payment processor 103 has already identified as being associated with the geographical region. In another embodiment, AL computing device 101 is configured to receive transaction data not specifically associated with the geographical region, and to parse the transaction data (e.g., using a merchant identifier, merchant location, and/or transaction location of each transaction) to identify a portion of the received transaction data that is associated with the geographical region. In such an embodiment, AL computing device 101 may discard any received transaction data not associated with the geographical region.

AL computing device 101 is further configured to process the received transaction data to identify a transaction location corresponding to each transaction. AL computing device 101 generates and stores a transaction record of each transaction including the corresponding transaction location and a transaction time. In some embodiments, AL computing device 101 is configured to calculate an expiration time for each transaction record. The expiration time may be calculated by adding a predetermined constant time interval to the transaction time (e.g., 15 minutes, 30 minutes, 4 hours, etc.) or may be calculated by adding a non-constant time interval to the transaction time. For example, the added time interval may be shortened or lengthened according to a number of transaction records generated within a period of time (e.g., according to a frequency of transactions) and/or a number of transaction records generated that are associated with a particular zone within the geographical region (e.g., according to a density of transactions). In some embodiments, AL computing device 101 is configured to calculate an average transaction amount. The average transaction amount may also be calculated relative to a predetermined or modified time interval.

AL computing device 101 may include a user interface to facilitate communicating with the user. Alternatively, or additionally, a user computing device 102 may include a user interface to communicate information to the user and AL computing device 101. For example, user computing device 102 may include a display device (or other media output) to display at least one map of the selected geographic region to user 110 to identify active locations. User computing device 102 may further include an input device to receive commands and/or requests from user 110. In the example embodiment, AL computing device 101 displays, or causes user computing device 102 to display, a street map of the geographical region to user 110. In some embodiments, user 110 is able to manipulate the displayed street map (e.g., zoom in, zoom out, pan, etc.). The street map includes information such as historical and/or current activity or event information, which may be representative of a likely population density within the geographical region at a particular point in time. The street map may further account for semi-empirical data related to the expected location of people over the course of a day (e.g., higher traffic in urban areas during employment hours, higher traffic in suburban areas during non-employment hours, known high-density events such as sporting events or concerts) and other probabilistic analyses that attempt to predict the most likely activity level at a location. The street map may further include an icon or other indicator of a location of events in the geographical region, such that user 110 may accurately judge whether travel to locations may be initiated at optimal times and locations to suit the needs and/or desires of the user.

In the illustrated embodiment, AL computing device 101 is further in communication with an environmental data computing device 109, which transmits environmental data including event records, weather forecasts, physical attributes of a geographical region and/or other information (as described herein) to AL computing device 101. Environmental data may include information about upcoming events parsed from available sources (e.g., newspapers, newsletters, radio, television, etc.). In some embodiments the information may be curated by an organization or institution such as a business, government body, or educational institution. Environmental data may include locations and times associated with events likely to draw relatively high numbers of people thereto, including, but not limited to, weather, sporting events, concerts, conventions, plays, and other such events. In certain embodiments, environmental data computing device 109 may be configured to receive input from a plurality of available sources and parse the input for information such as upcoming events, weather forecasts, and physical features. Additionally or alternatively, environmental data computing device 109 may include web-crawling functionality, such that the Internet or another network may be searched, parsed, and/or indexed for information about upcoming events or environmental conditions or changes associated with the selected geographical region.

The AL computing device 101 may also be in communication with a merchant input data computing device 108 that transmits market data to AL computing device 101. Merchant data may be generated by merchants within the geographical region selected. Additionally and/or alternatively merchant data may be provided by other sources (e.g., patrons, critics, news organizations, etc.). Merchant data may include information about merchants within the geographical region such as frequency and/or velocity of transactions, physical capacity and current occupation of facilities, typical visit durations by patrons, average and current wait time of patrons, number of parking spaces and currently open spaces, promotional sales, remaining inventory, and/or other relevant data.

In the illustrated embodiment, AL computing device 101 is in further communication with a social media data computing device 107, which transmits social media data to AL computing device. Social media data may include aspects of the geographical region such as aesthetics, quality of products and services, type of typical patrons. Social media data associated with the geographical region may also be aggregated by volume and by velocity of new social media posts, wherein a sudden and large number of user generated data points including positive words may indicate a high level of activity for the selected geographic region. Conversely, minimal social media data may allow user 110 to infer a low activity level for the selected geographic region. In some embodiments social media data may be parsed, searched, and/or indexed for information about the geographical region including events, news, or other information indicating a level of activity for the geographical region. In some embodiments social media data may be associated with sources such as FACEBOOK®, TWITTER®, LINKEDIN®, and the like.

AL computing device 101 is configured to augment, enhance, or update the displayed representation of population density on the street map with representations of the transaction records. AL computing device 101 may additionally or alternatively be configured to display a separate, secondary map with representations of the transaction records. Accordingly, AL computing device 101 is described as displaying any information on the street map, such a reference may include one or both of these display methods. In so doing, AL computing device 101 supplements and enhances the above-described historical activity and/or semi-empirical activity data with representations of real-time population density information based on transaction traffic. It should be understood that, although the example embodiment is described with respect to financial transactions, environmental data, merchant input data, and/or social media data, AL computing device 101 may be further configured to receive and process additional and/or or alternative kinds of consumer-related data that are representations of activities executed by persons within the geographical region, which may be generally and collectively referred to as "activity" (e.g., gathering locations of people, actions on social media, Internet use or web traffic, etc.). Such activity may be representative of real-time activity levels. Each data point, or activity record, may be discretely displayed on the street map and/or otherwise displayed. For example, each activity record may be displayed as an icon at a location on the street map corresponding to the activity location of the activity record. As an alternative example, the street map may include a "heat map," wherein "hotter" areas of the heat map represent higher activity level. In such an example, the activity records may be displayed by increasing the "heat" of the heat map in a location on the map corresponding to the activity location of the activity record. Accordingly, user 110 may view the street map with the indications of the activity records thereon and may more precisely make travel plans to areas with the greatest (or lowest) activity levels (as represented by the activity records).

It should be understood that although the methods and systems disclosed herein are described with respect to planning travel for entertainment, shopping and similar activities, the disclosure is readily applicable to other activities that may benefit from real-time population density and activity level information. For example, but without limitation, the methods and systems may be applicable to other activities such as political rallies, large business conventions, religious or spiritual meetings, sudden or immediate social events (e.g., flash mobs), or film, photographic, or other artistic performances. In such cases, these other activities may utilize stored, received, retrieved, and/or otherwise accessible historical information associated with their activities, which may then be supplemented using the real-time transaction data as processed and displayed by AL computing device 101.

Figure 2:
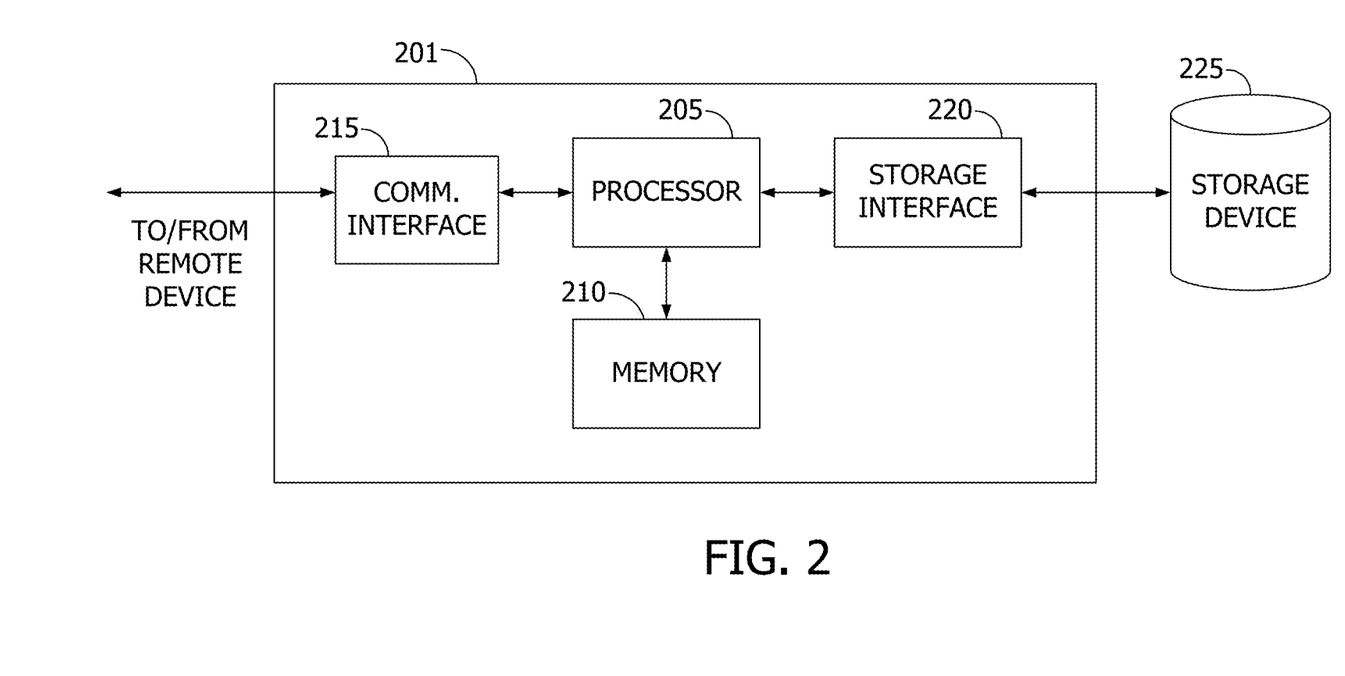
FIG. 2 illustrates an example configuration of a server computing system used in the AL computer system shown in FIG. 1.

FIG. 2 illustrates an example configuration of a server system 201 such as active locations (AL) computing device 101 (shown in FIG. 1) used to identify an active location within a geographical region, in accordance with one example embodiment of the present disclosure. Server system 201 includes a processor 205 for executing instructions. Instructions may be stored in a memory area 210, for example. Processor 205 may include one or more processing units (e.g., in a multi-core configuration) for executing instructions. The instructions may be executed within a variety of different operating systems on the server system 201, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 205 is operatively coupled to a communication interface 215 such that server system 201 is capable of communicating with a remote device such as a user system or another server system 201. For example, communication interface 215 may receive requests (e.g., requests to provide an interactive user interface) from a user computing device 102 (shown in FIG. 1) via the Internet, as illustrated in FIG. 1.

Processor 205 may also be operatively coupled to a storage device 225. Storage device 225 is any computer-operated hardware suitable for storing and/or retrieving data. In some embodiments, storage device 225 is integrated in server system 201. For example, server system 201 may include one or more hard disk drives as storage device 225. In other embodiments, storage device 225 is external to server system 201 and may be accessed by a plurality of server systems 201. For example, storage device 225 may include multiple storage units such as hard disks or solid state disks in a redundant array of inexpensive disks (RAID)

configuration. Storage device 225 may include a storage area network (SAN) and/or a network attached storage (NAS) system.

In some embodiments, processor 205 is operatively coupled to storage device 225 via a storage interface 220. Storage interface 220 is any component capable of providing processor 205 with access to storage device 225. Storage interface 220 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 205 with access to storage device 225.

Memory area 210 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 3:
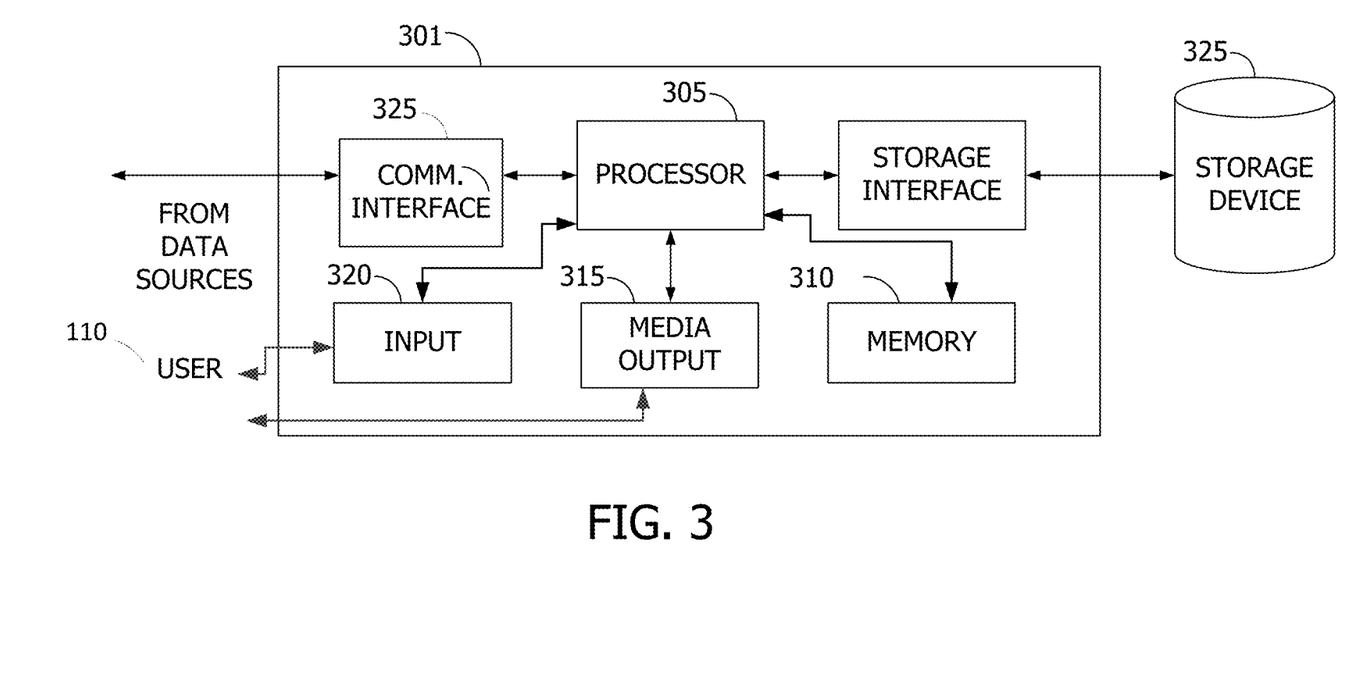
FIG. 3 illustrates an example configuration of a client computing device used in the AL computer system shown in FIG. 1.

FIG. 3 illustrates an example configuration of a client computing device 301. Client computing device 301 may include, but is not limited to, client systems ("user computing device") 102 (shown in FIG. 1). Client computing device 301 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media.

Client computing device 301 also includes at least one media output component 315 for presenting information to user 110 (shown in FIG. 1). Media output component 315 is any component capable of conveying information to user 110. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 301 includes an input device 320 for receiving input from user 110. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320. Stored in memory area 310 are, for example, computer-readable instructions for providing a user interface to user 110 via media output component 315 and, optionally, receiving and processing input from input device 320.

Client computing device 301 may also include a communication interface 325, which is communicatively couplable to a remote device such as active locations (AL) computing device 101 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 4:
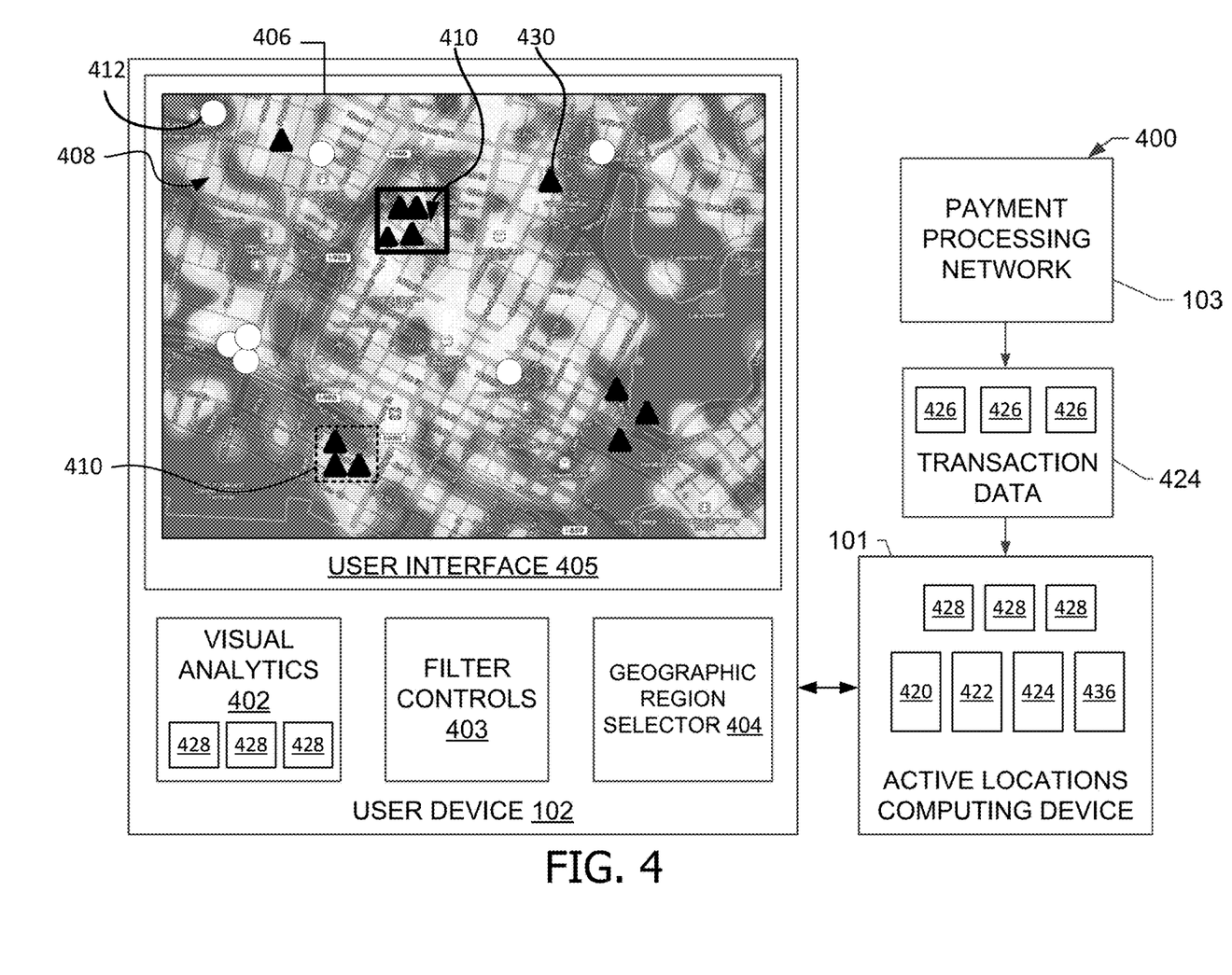
FIG. 4 is a data flow diagram illustrating the flow of data between various components of the AL computer system shown in FIG. 1.

FIG. 4 is a data flow diagram 400 illustrating the flow of data between various components of AL computer system 100 (shown in FIG. 1). In the illustrated embodiment, user computing device 102 (shown in FIG. 1) includes user interface (UI) 405, a visual analytics module 402, a filter controls module 403, and a geographic region selector module 404. Visual analytics module 402, filter controls module 403, and geographic region selector module 404 may include computer-executable instructions implemented on a processor (e.g., processor 305, shown in FIG. 3) of AL computing device 101 to specifically execute the functions described herein.

UI 405 is configured to display a street map 406 of a geographic region 408 selected by user 110 via geographic region selector module 404. Geographic region 408 represents a geographical region or area that user 110 is planning to travel to and that contains locations with restaurants, retails shops, or nightlife locations (e.g., bars, clubs). Geographic region selector module 404 is configured to divide geographic region 408 into a plurality of zones 410. In one embodiment, Geographic region selector module 404 divides geographic region 408 into a plurality of zones 410 with equal area, for example, as a grid. In another embodiment, geographic region selector module 404 divides geographic region 408 into zones 410 more contextually, for example, according to population density, number of merchants located therein, a number of blocks encompassed thereby, etc. In the illustrated embodiment, the boundaries of each zone 410 are not displayed on street map 406. However, in an alternative embodiment, the boundaries of each zone 410 are displayed on street map 406.

Filter controls module 403 is configured to process various information, as described herein, and to control display of street map 406 and the activity levels represented thereon. In the illustrated embodiment, street map 406 is displayed as a heat map, wherein areas of "high heat" indicate locations or zones 410 with high activity density (relative to other locations or zones 410 within geographic region 408). The activity density may be defined and controlled by user 110. User 110 may elect to view street map with different constraints. For example, user 110 may elect a visual representation incorporating only high transaction amounts. In other cases user 110 may wish to view street map 406 with traffic patterns, weather information, volume of social media activity, or other relevant factors. "High heat" may be represented with darker colors or shades, in certain embodiments, or with lighter colors or shades, in other embodiments. It should be understood that activity density may be illustrated on street map 406 using representations other than a heat map. In the example embodiment, street map 406 further includes indicators 412 of locations of merchants, associated POS 104 (shown in FIG. 1), within geographic region 408. (It should be understood that various elements of street map 406 may not be illustrated to scale in order to provide clarity and simplicity to the depiction of street map 406 in FIG. 4.)

AL computing device 101 is in communication with database 106 (shown in FIG. 1) such that AL computing device 101 may store information on and retrieve information from database 106. In the illustrated embodiment, database 106 stores social media data 420, merchant input data 422, transaction data 424, and environmental data 436 thereon, as described above. Merchant input data 422 includes historical and "real-time" or recent merchant information input by merchants, including activities, operating hours, and locations thereof. For example, historical and "real-time" or recent data may be stored as a table, with activities, times and locations of each data point associated with a corresponding activity or event. Transaction data 424 includes semi-empirical data related to the movement of people over the course of a day (e.g., that there is likely higher traffic in shopping areas during typical shopping hours, higher traffic in restaurant-dense areas during mealtimes, known high-density events such as sporting events or concerts). In some embodiments database 106 may include other probabilistic analyses that attempt to predict activity levels within geographic region 408 at various times of day and/or on various days of the week/month/year. Environmental data includes information about upcoming events parsed from available sources (e.g., newspapers, newsletters, radio, television etc.). Environmental data 436 may include locations and times associated with events or conditions likely to draw relatively high numbers of people thereto, including, but not limited to, sporting events, concerts, conventions, plays, and other such events. Filter control module 403 is configured to retrieve and process social media data 420, merchant input data 422, transaction data 424, and environmental data 436, and display a representation of current and/or expected or likely activity levels within geographic region 408 on street map 406 (e.g., as a heat map, in the example embodiment) based on the processing.

In the example embodiment, payment processor 103 (shown in FIG. 1) transmits a data signal to AL computing device 101 that includes transaction data 424 associated with a plurality of payment transactions 426. Each payment transaction 426 includes an associated transaction time, merchant identifier, and location identifier. The location identifier may identify a location at which the corresponding payment transaction 426 was initiated, a location of the corresponding cardholder at the time payment transaction 426 was initiated, and/or a merchant location. In the example embodiment, each payment transaction 426 is initiated within geographic region 408. In other embodiments, one or more payment transaction 426 may have been initiated at a location not within geographic region 408. AL computing device 101 may be configured to discard transaction data 424 including payment transactions 426 that were not initiated within geographic region 408. In some embodiments, AL computing device 101 substantially continuously receives transaction data 424 from payment processor 103. In other embodiments, for example, where AL computing device 101 (and/or network 105) has limited bandwidth, AL computing device 101 may receive transaction data 424 periodically (e.g., every minute, every 15 minutes).

AL computing device 101 is configured to store transaction data 424 in database 106. In addition, AL computing device 101 is configured to process social media data 420, merchant input data 422, transaction data 424, and environmental data 436 to generate activity level data 428. Visual analytics module 402 is configured to parse the received activity level data 428 and generate a formatted visualization of activity level data 428 associated with the geographic region 408. Each activity level data 428 includes the associated time and location of the activity level. Each activity level data 428 may further include an expiration time. The expiration time identifies a time that the corresponding activity level data 428 should be discarded and/or cleared from display on street map 406, as described further herein. Visualization analytics module 402 may calculate an expiration time for an activity level data 428 by adding a predetermined constant time interval to the transaction time (e.g., 15 minutes, 30 minutes, 4 hours, etc.). Additionally or alternatively, visualization analytics module 402 may calculate the expiration time for an activity level data 428 by adding a non-constant time interval to the transaction time. For example, the added time interval may be shortened or lengthened according to a number of activity level data 428 received within a period of time (e.g., according to a frequency of payment transactions 426) and/or a volume of activity level data 428 received that are associated with a particular zone 410 within geographic region 408 (e.g., according to a density of payment transactions 426). Visualization analytics module 402 may also use filter controls module 403 to identify specific factors to include and/or exclude on street map 406, further described herein.

Filter controls module 403 is configured to process user selected factors for removing or concealing a least a portion of activity level data 428 received from AL computing device 101. In some embodiments, filter controls module 403 displays activity level data 428 as an enhancement or update to the representation of activity data already displayed on street map 406. An "enhanced display device" and/or "enhanced street map," as used herein, refers generally to this combination display of real-time and historical activity data. Although not shown in the example embodiment, UI 405 may be configured to display a secondary street map alongside or otherwise adjacent to (primary) street map 406. Accordingly, wherein the following description refers to information displayed on "street map 406," such reference may include display on either or both a primary street map 406 and a secondary street map (not shown). In the illustrated embodiment, filter controls module 403 is configured to analyze and define elements in activity level data 428 to display on street map 406 limited variations of activity data as a representation of user-defined activity data within geographic region 408. Filter controls module 403 may configure UI 405 to display an updated or "enhanced" street map 406 which includes a hybrid or combination of the representation of merchant locations enhanced by the representation of activity level. In one embodiment, as shown, filter controls module 403 may facilitate display of activity level data 428 using merchant location indicator 430 on street map 406.

In another embodiment, rather than displaying merchant location indicator 430, filter controls module 403 may be configured to process activity level data 428 determine how a frequency and/or density of payment transaction 426 records may augment the "heat" of the displayed heat map. Filter controls module 403 may then adjust the heat of the displayed heat map to correspond to the likely activity level as indicated by the volume and/or frequency of received activity level data 428. In some embodiments, filter controls module 403 may implement both a "heat-adjustment" and a user-defined method of displaying activity level data 428 to user 110 (shown in FIG. 1) using UI 405. In any embodiment, filter controls module 403 is configured to represent activity levels within geographic region 408 using activity level data 428, such that user 110 may use the displayed street map 406 to readily identify areas of current high activity level and arrange travel plans accordingly. Filter controls module 403 is further configured to remove merchant location indicator 430 and/or decrease "heat" according to the expiration times of activity level data 428 represented on street map 406.

In certain embodiments, geographic region selector module 404 is configured to allow user 110 to define parameters for display of street map 406 on user interface 405. Geographic region selector module 404 may allow the user to select the geographic region by street name, neighborhood name, map coordinates, category of activity, or other such identifying features of an area. In some embodiments geographic region selector module 404 may automatically adjust street map 406 to display the current location of user 110 through the use of location identification methods not shown (e.g., IP address of user computing device 102, GPS of user computing device 102, etc.). Geographic region selector module 404 may also automatically zoom in on areas with high levels of activity from within a pre-determined larger zone that user 110 may typically travel to or from, thereby allowing user 110 to avoid having to manually enter in a frequently visited location.

Figure 5:
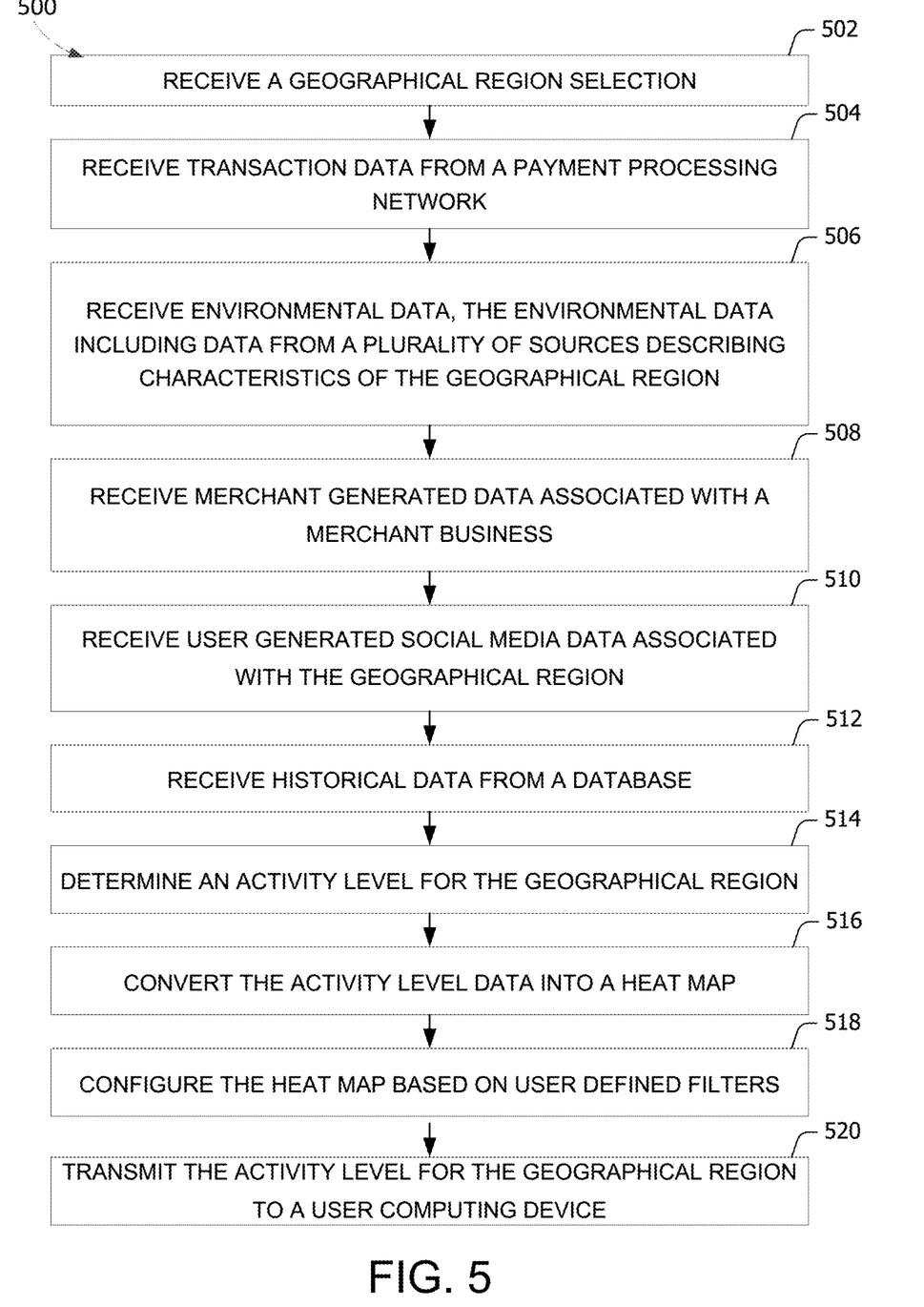
FIG. 5 is a flowchart of an example method for converting and displaying activity data using the AL computer system shown in FIG. 1.

FIG. 5 is a simplified diagram of an example method 500 for identifying active locations in a geographic region using AL computer system 100 (shown in FIG. 1). One or more steps of method 500 may be implemented using active locations (AL) computing device 101 (also shown in FIG. 1).

Method 500 includes receiving 502 a geographical region selection associated with a desired location defined by user 110. Method 500 also includes receiving 504 transaction data from a payment processing network, the transaction data including a merchant identifier including the merchant location. Method 500 also includes receiving 506 environmental data, the environmental data including data from a plurality of sources describing characteristics of the geographical region. Method 500 further includes receiving 508 merchant generated data. In the example embodiment, the merchant generated data is associated with a merchant business. Method 500 also includes receiving 510 user generated social media data, the social media data associated with the geographical region selected. Method 500 also includes receiving 512 historical data from a database. Method 500 further includes determining 514 an activity level for the geographical region.

Method 500 also includes converting 516 the activity level data. In the example embodiment the activity level data is converted 516 into a heat map for visual display to user 110. Method 500 further includes configuring 518 the heat map based on user defined filters. The configuring 518 may include a default display configuration automatically generated by pre-determined settings. Additionally or alternatively, configuring 518 may be performed based on user-defined parameters. Method 500 includes transmitting 520 the activity level for the geographical region selection to a user computing device.

Method 500 may include additional or alternative steps, including those described elsewhere herein. For example, method 500 may include steps for determining and display other representation analytics than average transaction distance, such as a number of transaction or an average transaction amount.

Figure 6:
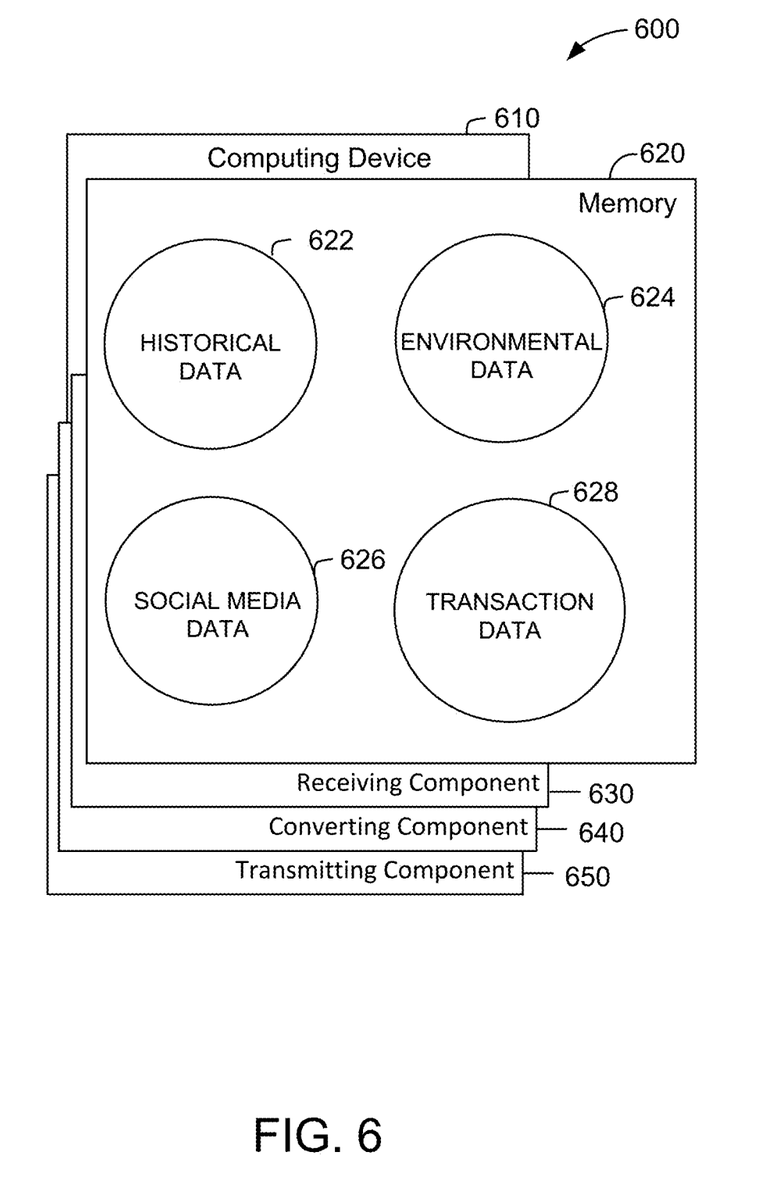
FIG. 6 shows a diagram of components of an example computing device that may be used in the AL computer system shown in FIG. 1 to facilitate converting and displaying activity data.

FIG. 6 shows a diagram of components 600 of an example computing device 610 that may be used in active locations computer system 100 shown in FIG. 1 to facilitate converting disparate data sources into a visually accessibly format based on activity levels in a geographical region. In some embodiments, computing device 610 is similar to AL computing device 101 (shown in FIGS. 1 and 4). A memory 620 is coupled to several separate components within computing device 610, which perform specific tasks. Memory 620 may be similar to database 106 (shown in FIG. 1) and is configured to store information. In the illustrated embodiment, memory 620 stores (by way of example and not limitation) historical activity level data 622 (which may include past activity levels and/or semi-empirical data suggesting likely highly active times), environmental data 624 (which describes characteristics of a geographical region including weather, parking, and the like), social media data 626, and transaction data 628. In the example embodiment receiving component 630 is coupled to computing device 610 and may be configured to receive data from a variety of sources. Converting component 640 may be coupled to receiving component 630 and may be further coupled to computing device 610 and is configured to process received data into activity data. Additionally, or alternatively, converting component 640 may generate a heat map. Transmitting component 650 may be coupled to computing device 610 and may be further coupled to converting component 640. Transmitting component 650 may also be coupled to receiving component 630. Transmitting component may be configured to transmit activity data and/or a generated heat map.

Figure 7:
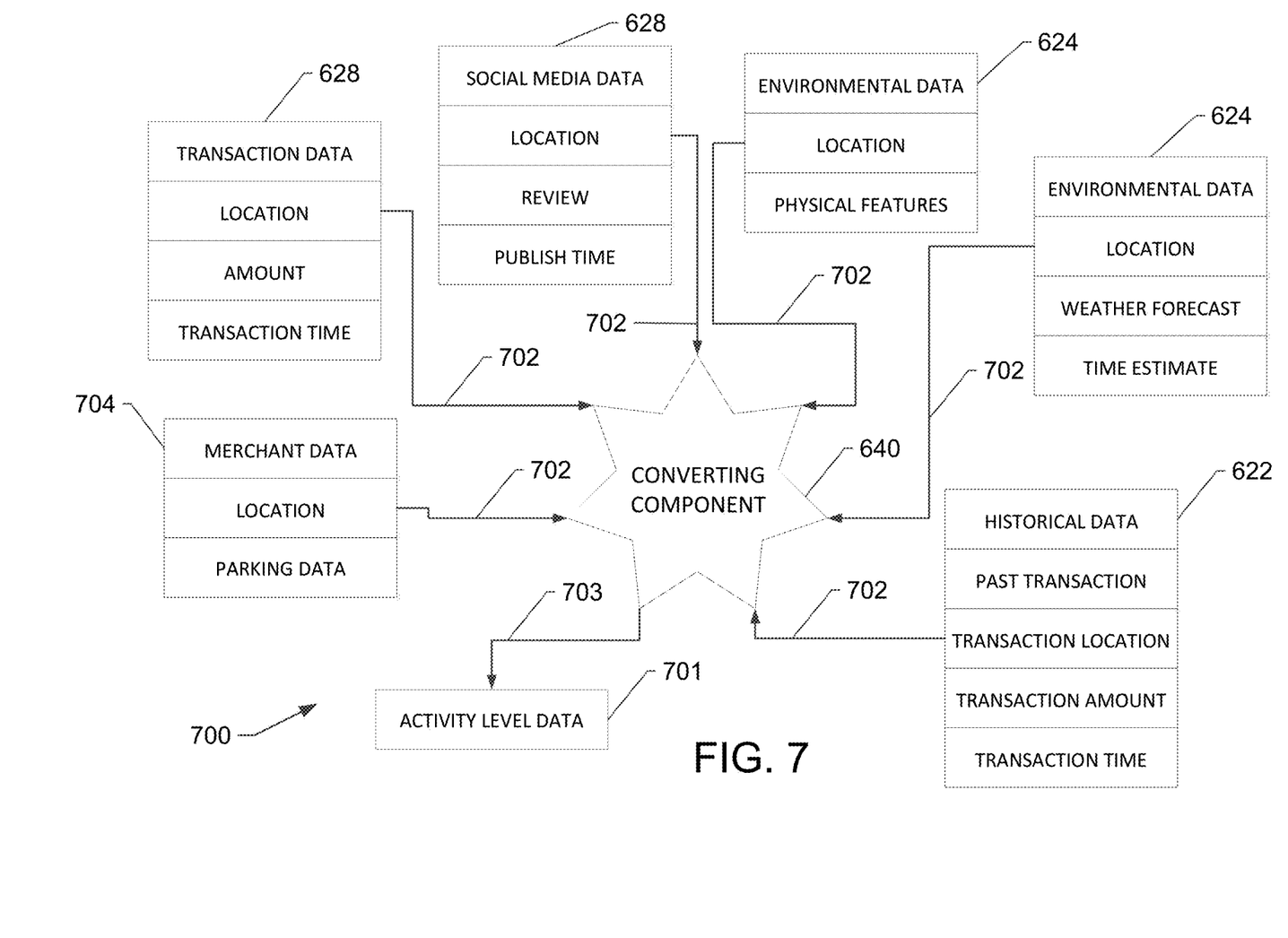
FIG. 7 shows a schematic of an example arrangement of data converted by AL computer system shown in FIG. 1.

FIG. 7 shows a schematic of data arrangement 700 of an example conversion of data as described above by converting component 640. Converting component 640 may receive location identifier 702 from a variety of data sources. In the example embodiment, converting component 640 may receive merchant data 704 associated with a particular location. Converting component 640 may also receive transaction data 628 for a transaction associated with a particular location. In the example embodiment, transaction data 628 includes recent payment transactions initiated by cardholders 110 with merchants located in different geographic areas. The recent payment transactions may have been initiated with a predetermined amount of time prior to receiving a request for an activity level. In the example embodiment the predetermined amount of time may be within 2 or 3 hours preceding the request. The time periods may also be configured in half hour buckets where transaction levels (e.g., transaction velocities) are broken down in half hour buckets.

Converting component 640 may also receive social media data 628 including a review associated with a particular location. Converting component 640 may also receive environmental data associated 624 including physical features associated with a particular location. Converting component 640 may also receive environmental data 624 including weather forecasts for the location. Converting component 640 may also receive historical data 622 including past transaction data associated with a particular location. In the example embodiment, converting component 640 may convert the received data, which may include different data types, sets, and/or formats, and arrange the data into a manner that is quickly accessed by transmitting component 650 (shown in FIG. 6). Alternatively, or in addition, converting component 640 may arrange the data according to time (e.g., in chronological order). Alternatively, or in addition, converting component 640 may exclude data sets according to input from user 110 (shown in FIG. 1).

In addition, although various elements of the active locations computer system are described herein as including general processing and memory devices, it should be understood that the active locations computer system is a specialized computer configured to perform the steps described herein for facilitating conversion of disparate sources of data into a visually accessibly format for a user planning to travel to a location.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active locations (AL) computing device including at least one processor in communication with at least one memory device, said at least one processor programmed to:
   receive, from a user computing device, a selection of a geographical region;
   receive transaction data from a payment processing network, the transaction data including a plurality of transaction records, each transaction record associated with communications between an issuer and an acquirer over the payment processing network to process a corresponding payment transaction, the acquirer configured to receive payment transaction authorization requests from a merchant conducting the payment transaction with a cardholder, each transaction record including a transaction location within the selected geographical region and a time stamp, wherein the plurality of transaction records for the selected geographical region are received substantially continuously and in real-time;
   retrieve environmental data including data representing environmental conditions at the selected geographical region, wherein the environmental data includes current traffic conditions across the selected region;
   retrieve social media data including events occurring within the selected geographical region;
   calculate a velocity of transactions at a plurality of locations in the selected geographical region from the transaction records;
   calculate a velocity of events at the plurality of locations in the selected region from the social media data;
   determine activity levels at each of the plurality of locations for the selected geographical region based on the velocity of transactions and the velocity of events;
   represent the activity levels for the plurality of locations as a user interactive heat map for the selected geographical region;
   apply a user-controlled filter to the heat map, wherein the user-controlled filter is configured to selectively overlay the current traffic conditions on the heat map; and
   transmit the filtered heat map for the selected geographical region to the user computing device to cause the filtered heat map to be displayed on the user computing device.

2. The computing device of claim 1, wherein the environmental data further includes at least one of weather data, news data, and parking data.

3. The computing device of claim 1, wherein said processor is further configured to update a historical database, based on at least one of the transaction data, the environmental data, and the social media data.

4. The computing device of claim 1, wherein the filter is configured based on data received from the user computing device.

5. The computing device of claim 1, wherein the filter is configured based on a current geographical location, the current geographical location received from the user computing device.

6. A computer-implemented method for identifying active locations within a geographic region using an active locations (AL) computing device including a processor in communication with a memory, said method comprising:
   receiving, from a user computing device, a selection of a geographical region;
   retrieving transaction data from a payment processing network, the transaction data including a plurality of transaction records, each transaction record associated with communications between an issuer and an acquirer over the payment processing network to process a corresponding payment transaction, the acquirer configured to receive payment transaction authorization requests from a merchant conducting the payment transaction with a cardholder, each transaction record including a transaction location within the selected geographical region and a time stamp, wherein the plurality of transaction records for the selected geographical region are received substantially continuously and in real-time;
   retrieving environmental data including data representing environmental conditions at the selected geographical region, wherein the environmental data includes current traffic conditions across the selected region;
   retrieving social media data including events occurring within the selected geographical region;
   calculating a velocity of transactions at a plurality of locations in the selected geographical region from the transaction records;
   calculating a velocity of events at the plurality of locations in the selected region from the social media data;
   determining activity levels at each of the plurality of locations for the selected geographical region based on the velocity of transactions and the velocity of events;
   represent the activity levels for the plurality of locations as a user interactive heat map for the selected geographical region;
   applying a user-controlled filter to the heat map, wherein the user-controlled filter is configured to selectively overlay the current traffic conditions on the heat map; and
   transmitting the filtered heat map for the selected geographical region to the user computing device to cause the filtered heat map to be displayed on the user computing device.

7. The computer-implemented method of claim 6, wherein the environmental data further includes at least one of weather data, news data, and parking data.

8. The computer-implemented method of claim 6, wherein the processor is further configured to update a historical database, based on at least one of the transaction data, the environmental data, and the social media data.

9. The computer-implemented method of claim 6, wherein the filter is configured based on data received from the user computing device.

10. The computer-implemented method of claim 6, wherein the filter is configured based on a current geographical location, the geographical location received from the user computing device.

11. At least one non-transitory computer-readable storage medium having computer-executable instructions embodied thereon, wherein when executed by an active locations (AL) computing device including at least one processor in communication with a memory, the computer-executable instructions cause the at least one processor to:

receive, from a user computing device, a selection of a geographical region;

retrieve transaction data from a payment processing network, the transaction data including a plurality of transaction records, each transaction record associated with communications between an issuer and an acquirer over the payment processing network to process a corresponding payment transaction, the acquirer configured to receive payment transaction authorization requests from a merchant conducting the payment transaction with a cardholder, each transaction record including a transaction location within the selected geographical region and a time stamp, wherein the plurality of transaction records for the selected geographical region are received substantially continuously and in real-time;

retrieve environmental data including data representing environmental conditions at the selected geographical region, wherein the environmental data includes current traffic conditions across the selected region;

retrieve social media data including events occurring within the selected geographical region;

calculate a velocity of transactions at a plurality of locations in the selected geographical region from the transaction records;

calculate a velocity of events at the plurality of locations in the selected region from the social media data;

determine activity levels at each of the plurality of locations for the selected geographical region based on the velocity of transactions and the velocity of events;

represent the activity levels for the plurality of locations as a user interactive heat map for the selected geographical region;

apply a user-controlled filter to the heat map; and transmit the filtered heat map for the selected geographical region to the user computing device to cause the filtered heat map to be displayed on the user computing device.

12. The computer-readable storage medium in accordance with claim 11, wherein the environmental data further includes at least one of weather data, news data, and parking data.

13. The computer-readable storage medium in accordance with claim 11, wherein the computer-executable instructions further cause the at least one processor to update a historical database, based on at least one of the transaction data, the environmental data, and the social media data.

14. The computer-readable storage medium in accordance with claim 11, wherein the filter is configured based on data received from the user computing device.

* * * * *